US008463835B1

(12) United States Patent
Walke (10) Patent No.: US 8,463,835 B1
(45) Date of Patent: Jun. 11, 2013

(54) CIRCUIT FOR AND METHOD OF PROVIDING A FLOATING-POINT ADDER

(75) Inventor: Richard Walke, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 1051 days.

(21) Appl. No.: 11/901,165

(22) Filed: Sep. 13, 2007

(51) Int. Cl.
*G06F 7/42* (2006.01)

(52) U.S. Cl.
USPC ............ 708/505; 708/200; 708/209; 708/495

(58) Field of Classification Search
None
See application file for complete search history.

(56) References Cited

U.S. PATENT DOCUMENTS

| | | | | |
|---|---|---|---|---|
| 5,416,731 | A * | 5/1995 | Dang et al. | 708/209 |
| 6,446,104 | B1 * | 9/2002 | Tzeng et al. | 708/503 |
| 7,225,216 | B1 * | 5/2007 | Wyland | 708/501 |
| 7,707,236 | B2 * | 4/2010 | Srivastava | 708/505 |
| 2005/0210095 | A1 * | 9/2005 | Lutz et al. | 708/700 |

OTHER PUBLICATIONS

M.S. Schmookler and K. J. Nowka, "Leading Zero Anticipation and Detection—A Comparison of Methods", 15th IEEE Symposium on Computer Arithmetic, 2001, Jun. 11-13, 2001, pp. 7-12.
S. Knowles, "Arithmetic Processor Design for the T9000 Transputer", Proc. SPIE, vol. 1566, Dec. 1, 1991, pp. 230-243.

* cited by examiner

*Primary Examiner* — Michael D Yaary
(74) *Attorney, Agent, or Firm* — John J. King (57) ABSTRACT

A floating-point adder circuit is described. The circuit comprises an input multiplexer coupled to receive a first input value and a second input value; an adder-subtractor circuit selectively coupled to receive one of the first input value and the second input value at each of a first input and a second input, wherein the value coupled to the second input is added to or subtracted from the value coupled to the first input; a right shift circuit for aligning the smaller of the first input value and the second input value which is coupled to the second input of the adder-subtractor circuit; and an additional shift circuit (e.g., a left shift/right shift circuit of a combined near path and far path) coupled to the output of the adder-subtractor circuit. A method of implementing a floating-point adder is also disclosed.

18 Claims, 9 Drawing Sheets

CIRCUIT FOR AND METHOD OF PROVIDING A FLOATING-POINT ADDER

FIELD OF THE INVENTION

The present invention relates generally to adder circuits, and in particular, to a circuit for and a method of providing a floating-point adder.

BACKGROUND

Mathematical operations may be performed using either a floating-point format or a fixed-point format. A floating-point format offers a higher dynamic range than a fixed-point format by representing a number with a combination of a sign, a mantissa and an exponent. A floating-point format is often implemented according to the IEEE-754 standard for floating-point arithmetic, where the mantissa is a normalized number between 1 and 2, and scaled by a power of 2, as dictated by the exponent. The sign indicates whether the number is negative or positive. The floating-point format is used for a number of reasons. For example, floating-point mathematical operations avoid the need to perform analysis or simulation to identify the scaling necessary to keep numbers in a fixed-point range. Further, when a problem is ill conditioned, the use of floating-point arithmetic may lead to a numerically superior solution, for example, without the need to greatly increase fixed-point word length.

Floating-point mathematical operations provide a dynamic range which allows some algorithms to be reformulated with fewer operations. Floating-point mathematical operations may also obtain the same dynamic range as fixed-point with fewer bits. Accordingly, the underlying floating-point components may be smaller than components for fixed-point operations. On programmable devices where multiplier size is predefined, for example, where a multiplier takes 18 inputs, an 18-bit multiplier used to implement a floating-point format may provide a greater dynamic range than an 18-bit fixed-point multiplier on its own, thus avoiding the need for four multipliers to be combined to get a greater word length. For a given dynamic range, floating-point mathematical operations require fewer bits, thereby reducing the storage and memory bandwidth requirements. In some graphics applications, a 16-bit representation is used. For example, graphics cards may use a 16-bit floating-point format having an 11-bit mantissa and 5-bit exponent to obtain high dynamic range within the packing constraints of 32 and 64-bit memories.

Mathematical operations requiring floating-point or fixed-point formats may be implemented in any type of circuit, such as an integrated circuit. While integrated circuits are typically designed for a particular application, one type of integrated circuit which enables flexibility is a programmable logic device (PLD). A PLD is designed to be user-programmable so that users may implement logic designs of their choices. One type of PLD is the Complex Programmable Logic Device (CPLD). A CPLD includes two or more "function blocks" having a two-level AND/OR structure connected together and to input/output (I/O) resources by an interconnect switch matrix. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources according to a routing configuration. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., FLASH memory, as in some CPLDs), or in any other type of memory cell.

However, the cost of performing floating-point arithmetic on an FPGA is considered very high relative to fixed-point arithmetic. Of the basic floating-point operations, addition and multiplication are the most common operations. Of the two, the cost of floating-point multiplication is relatively low compared to fixed-point multiplication. Floating point multiplication is obtained using a fixed-point multiplier with a relatively small amount of additional logic to calculate the exponent and perform a 1-bit normalization and rounding of the mantissa. In contrast, floating-point addition requires shifters to provide alignment and normalization of mantissas, prior to and following the fixed-point addition. These shifters are expensive to implement in an FPGA, and incur substantial additional logic delay over a fixed-point adder. When performing accumulation, the latency may lead to a reduction in sample rate, or an increase in complexity to accommodate the associated latency in another way.

Accordingly, there is a need for an improved circuit for and method of providing a floating-point adder.

SUMMARY

A floating-point adder circuit is described. The circuit comprises an input multiplexer coupled to receive a first input value and a second input value; a first adder-subtractor circuit selectively coupled to receive one of the first input value and the second input value at each of a first input and a second input, wherein the value coupled to the second input is added to or subtracted from the value coupled to the first input; a right shift circuit for aligning the smaller of the first input value and the second input value which is coupled to the second input of the adder-subtractor circuit; and an additional shift circuit (e.g., a left shift/right shift circuit of a combined near path and far path) coupled to the output of the first adder-subtractor circuit.

The floating point adder circuit may further include a second adder-subtractor circuit selectively coupled to receive the first and second input values, where the value of the second input is added to or subtracted from the value of the first input when performing a far path calculation. The floating point adder circuit may further include a right shifter adapted to align the smaller of the first input value and the second input value coupled to the second input of the second adder-subtractor circuit. The first adder-subtractor circuit may comprise a subtraction circuit for a near path calculation of the floating-point adder circuit, or an adder-subtractor circuit of a combined near path and far path. The floating point adder circuit may further comprise a leading zero anticipation circuit coupled to receive at least a portion of the first and second input values, the leading zero anticipation circuit providing a shift value when the left shift/right shift circuit is performing a left shift.

According to an alternate embodiment, a floating-point adder circuit comprises an input multiplexer coupled to receive a first input value and a second input value; a first adder-subtractor circuit selectively coupled to receive one of the first input value and the second input value at each of a first input and a second input, wherein the value coupled to the second input is added to or subtracted from the value coupled to the first input; a multiplier coupled to receive the output of the first adder-subtractor circuit; and a second adder-subtractor circuit coupled to receive the output of the multiplier.

The floating point adder circuit may also include a leading zero anticipation circuit coupled to receive at least a portion of the first and second input values, the leading zero anticipation circuit providing a shift value when performing a left shift after a subtraction by the first adder-subtraction circuit. The floating point adder circuit may further include a decoder coupled to receive the output of the leading zero anticipation circuit, the decoder generating a value for enabling the multiplier to shift the output of the first adder-subtractor circuit by a predetermined value based upon the value generated by the decoder. The multiplier preferably provides normalization for a near path calculation. The floating point adder circuit may further comprise a normalization circuit at the output of the second adder-subtractor circuit, the normalization circuit providing normalization for a far path calculation.

A method of enabling an arithmetic calculation using values in a floating-point format is also disclosed. The method comprises determining whether the arithmetic calculation involving a first input value and a second input value comprises a near path calculation or a far path calculation; determining whether a right shift of the smaller value of the first input value and the second input value is required for a near path calculation; selecting one of the smaller value or the smaller value which is right shifted based upon a comparison of exponents of a first input value and a second input value; generating a result based upon an addition of the selected value to the larger value of the first and second input values or a subtraction of the selected value from the larger value; and determining an amount of a shift of the result of the addition or subtraction. The method of may provide a combined near path circuit and far path circuit, and use a single shift circuit as both a left shift circuit and a right shift circuit. According to an alternate embodiment, the method may further comprise using a multiplier as a shifter.

DETAILED DESCRIPTION OF THE DRAWINGS

Figure 1:
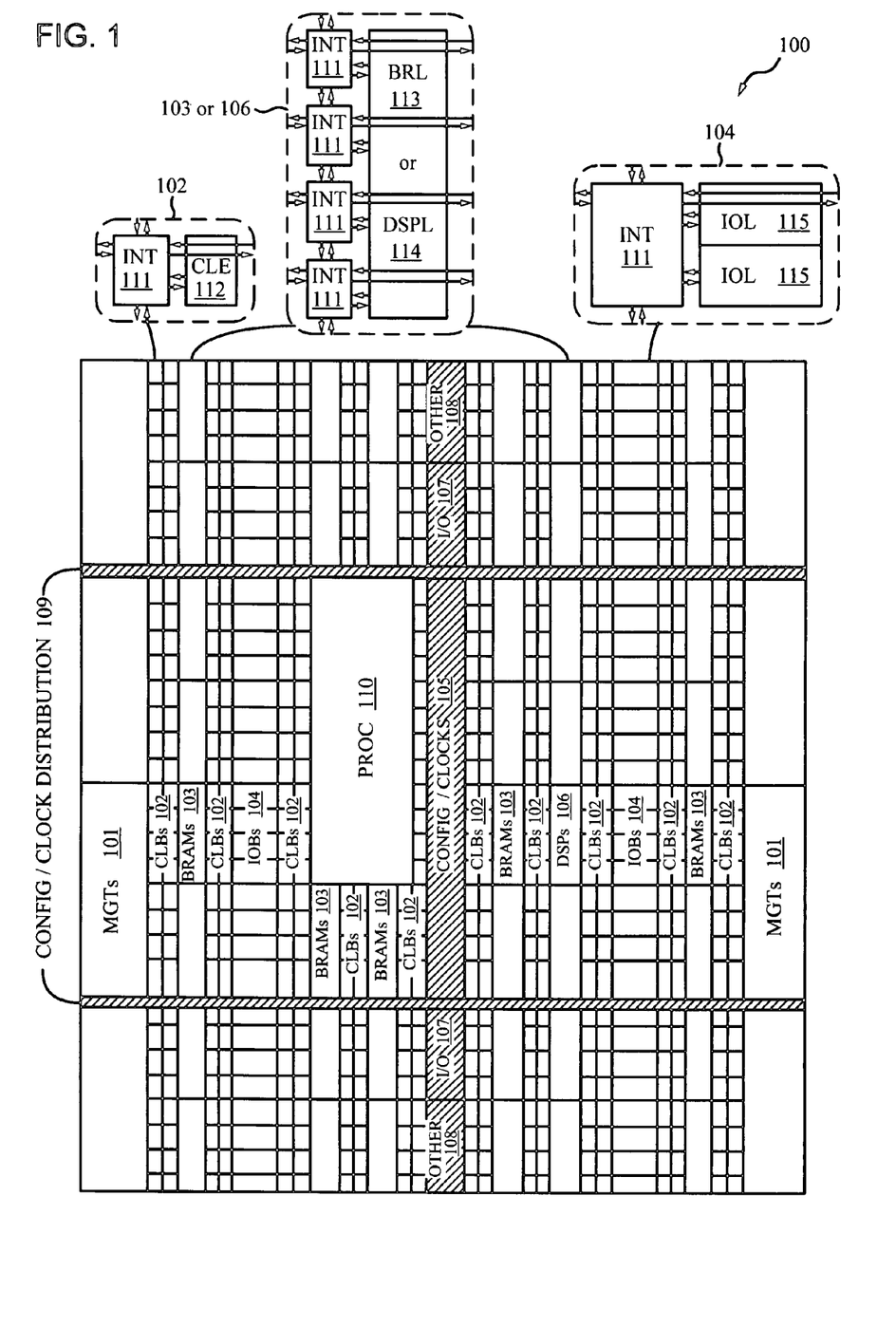
FIG. 1 is a block diagram of a field programmable gate array according to an embodiment of the present invention.

Turning first to FIG. 1, a block diagram of a field programmable gate array according to an embodiment of the present invention is shown. The FPGA architecture 100 of FIG. 1 includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 may include a configurable logic element (CLE 112) that may be programmed to implement user logic plus a single programmable interconnect element (INT 111). As will be described in more detail below, the values stored in the lookup table may be stored in configuration memory elements, often called distributed RAM, which are inputs to a multiplexer tree. A BRAM 103 may include a BRAM logic element (BRL 113) in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 106 may include a DSP logic element (DSPL 114) in addition to an appropriate number of programmable interconnect elements. An IOB 104 may include, for example, two instances of an input/output logic element (IOL 115) in addition to one instance of the programmable interconnect element (INT 111).

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Some FPGAs utilizing the architecture illustrated in FIG. 1 include additional logic blocks that disrupt the regular columnar structure making up a large part of the FPGA. The additional logic blocks may be programmable blocks and/or dedicated logic. For example, the processor block PROC 110 shown in FIG. 1 spans several columns of CLBs and BRAMs. Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

Figure 2:
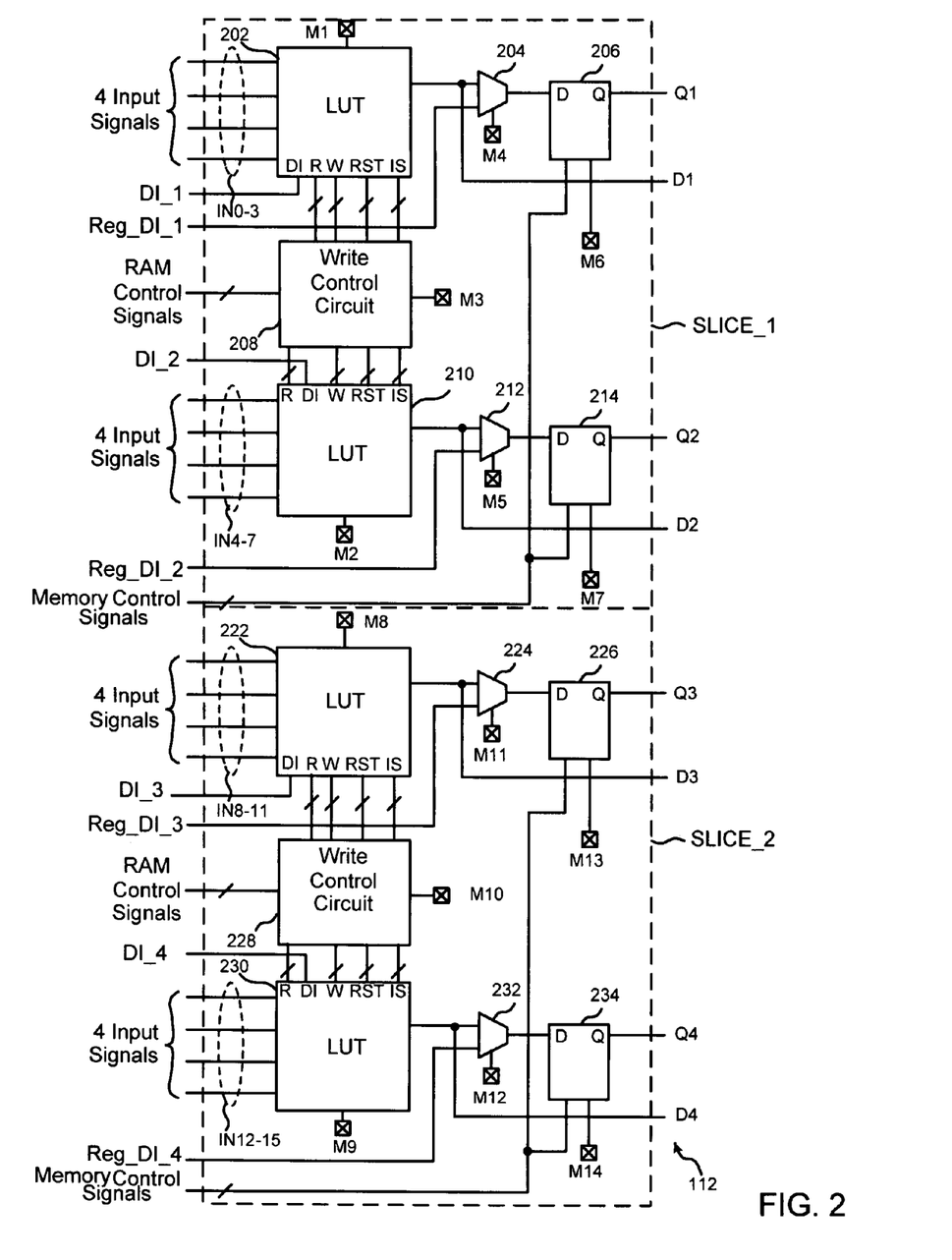
FIG. 2 is a block diagram of a configurable logic element of the field programmable gate array of FIG. 1 according to an embodiment of the present invention.

Turning now to FIG. 2, a block diagram of a configurable logic element of the field programmable gate array of FIG. 1 according to an embodiment of the present invention is shown. In particular, FIG. 2 illustrates in simplified form a configurable logic element of a configurable logic block 102 of FIG. 1. The configurable logic element shown comprises two similar slices, labeled SLICE_1 and SLICE_2 in the figure, where each slice comprises a pair of function generators. However, the configurable logic element may comprise more slices, such as four slices, for example. Each function generator may function in any of several modes depending upon the configuration data in the configuration memory elements M1-M14. When in RAM mode, input data is supplied by input terminals DI_1 and DI_2 to the data input (DI) terminal of the associated function generator. Each function generator, which may comprise a lookup table storing data in the entries of the lookup table, provides an output signal to an associated multiplexer, which selects between the output signal of the function generator and an associated register direct input signal Reg_DI_1 or Reg_DI_2 from the programmable interconnect element. Thus, each function generator may be optionally bypassed. When in a look-up table mode, each function generator implemented as a look-up table in the example of FIG. 2 has three input signals which will address one of eight memory elements of the LUT. The memory elements of the LUT are stored with data provided to the programmable logic device as a part of a configuration bitstream. Slice 1 comprises a function generator implemented as a LUT 202 coupled to a multiplexer 204. In particular, the LUT 202 receives 3 input signals A1-A3 which are decoded to generate an output D1 associated with data stored in the LUT at the address designated by the input signals. The multiplexer 204 is adapted to receive the output of LUT 202 and a registered value of Reg_DI_1. The output of the multiplexer 204 is coupled to a register 206 which generates an output Q1.

A Write Control Circuit 208 is coupled to receive RAM control signals and generate signals to control the LUT 202. In addition to a data input (DI) coupled to receive DI_1 and conventional read and write control signals coupled to a read enable input (R) and a write enable input (W), respectively, the LUT 202 comprises a partial reset input (RST) for receiving a partial reset signal, and an initial state input (IS) for receiving an initial state signal. Such resetting of the memory elements enables resetting the LUT memory cells during a partial reconfiguration of a programmable logic device, including partial reconfiguration of a device during operation. One advantage of resetting LUT memory elements of a device during partial reconfiguration is that it is not necessary to cycle through the required clock cycles to set the correct data after the partial reconfiguration. Similarly, slice 1 comprises a function generator implemented as a LUT 210 coupled to a multiplexer 212. The LUT 210 is adapted to receive input signals A4-6, while the multiplexer 212 is coupled to receive the output D2 of the LUT 210 and the registered input value Reg_DI_2. The output of the multiplexer 212 is coupled to a register 214 which generates an output Q2. The write control circuit 208 also generates a partial reset signal and an initial state signal for selectively resetting or setting one or more of the bits of the LUT 210.

Similarly, slice 2 comprises a function generator implemented as a LUT 222 coupled to a multiplexer 224. The LUT 222 is adapted to receive input signals A7-9, while the multiplexer 224 is coupled to receive the output of the LUT 222 and a registered input value Reg_DI_3. The output of the multiplexer 224 is coupled to a register 226 which generates an output Q3. A Write Control Circuit 228 is coupled to receive RAM control signals and generate signals to control the LUT 222. In particular, input signals A7-A9 are decoded to generate an output D3 associated with data stored in the LUT at the address designated by the input signals. The LUT 222 comprises a partial reset input (RST) for receiving a partial reset signal, and an initial state input (IS) for receiving an initial state signal. Similarly, slice 2 comprises a function generator implemented as a LUT 230 coupled to a multiplexer 232. The LUT 230 is adapted to receive input signals A10-12, while the multiplexer 232 is coupled to receive the output D4 of the LUT 230 and a registered input value Reg_DI_4. The output of the multiplexer 232 is coupled to a register 234 which generates an output Q4. The write control circuit 228 also generates a partial reset signal and an initial state signal for selectively resetting or setting one or more of the bits of the LUT 230. The circuits of FIGS. 3-11, described in detail below, may be implemented in the circuits of FIGS. 1-2. Alternatively, the circuits and methods of the present invention may be implemented in any device, including any type of integrated circuit having programmable logic.

Figure 3:
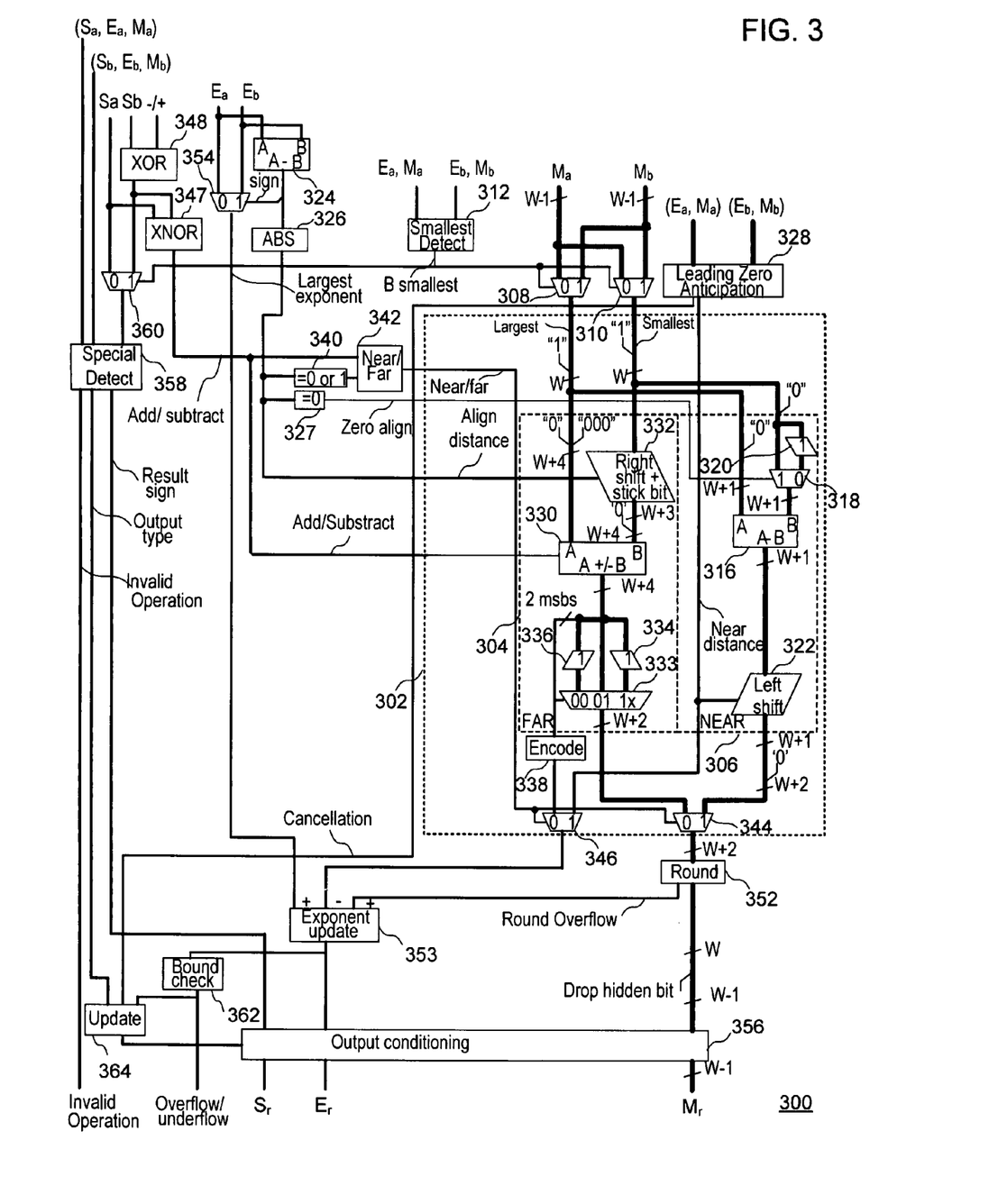
FIG. 3 is a block diagram of a circuit for implementing floating-point addition according to an embodiment of the present invention.

Turning now to FIG. 3, a block diagram of a circuit for implementing floating-point addition according to an embodiment of the present invention is shown. In order to reduce the implementation cost of a floating-point adder in an FPGA, a fixed-point multiplier is used to implement the floating-point adder. That is, because multipliers are available as embedded resources within many FPGAs, the circuit of FIG. 3 may be implemented using existing circuitry or by modifying conventional circuit blocks of FPGAs. The dual-path arrangement of FIG. 3 employs a near path which is used when the numbers are sufficiently near to each other, such that cancellation of more than one leading bit may occur. Specifically, the near path is used when the difference between exponents is a maximum of one, and the operation is a true subtraction. Because the sign of a second input is inverted to obtain floating-point subtraction, a true subtraction of the mantissas is performed based upon the signs of the inputs. Consequently, full normalization may be required, but alignment is only by 0 or 1 bit, and so may be performed with a 2-to-1 multiplexer rather than a multi-bit shifter. A far path is used when the numbers are relatively far apart. Specifically, the far path is used when the exponent difference is greater than one and a true subtraction is performed. The far path is also used for all exponent differences when a true addition is performed. Alignment prior to addition/subtraction requires the ability to perform a multi-bit right-shift, while normalization after addition/subtraction requires only at most a 1-bit right-shift or 1-bit left-shift, which may be implemented with a 3-to-1 multiplexer.

Referring specifically to FIG. 3, a dual-path floating-point adder circuit 300 comprises a dual path processing portion 302 comprising a far path 304 and a near path 306. A first value "a" having a mantissa $M_a$, an exponent $E_a$, and a sign $S_a$, and a second value "b" having a mantissa $M_b$, an exponent $E_b$, and a sign $S_b$ to be processed by the dual-path floating-point adder are coupled to an input multiplexer portion. The multiplexer portion comprises a first multiplexer 308 and a second multiplexer 310. The widths of the signals are shown as a function of the mantissa width W, which may be 24 bits for single precision and 53 bits for double precision, as is well known in the art of floating-point arithmetic. Because the "a" and "b" values are normalized, the most significant bit (msb) may be dropped. That is, only the bits necessary for a computation are stored to minimize the storage requirements. Therefore, (W−1) bits of the mantissa values are coupled to the input multiplexer portion, and the additional (hidden) bit is added after the input multiplexer. The multiplexers are used to select the mantissa associated with the largest number and the smallest number, as determined by comparing the mantissas and the exponents. In particular, the first multiplexer 308 and a second multiplexer 310 are coupled to select one of a first mantissa $M_a$ and a second mantissa $M_b$ in response to a selection signal from a smallest detect circuit 312. The smallest detect circuit 312 will determine which of the two values is the smallest, and select the mantissa of the larger value to be output by the first multiplexer 308 and the mantissa of the smaller value to be output by the second multiplexer 310.

A leading one is added to the values output by the multiplexers to generate a value having a width of W bits, each of which is coupled to the far path 304 and the near path 306. A lagging zero is coupled to the mantissa having the larger value, which is coupled the A input of a subtractor circuit 316 implementing the function A-B of the near path. Subtractor 316 may add A to a negatively weighted value of B, and comprises a pre-adder. A lagging zero is also coupled to the smallest value, which is coupled to a first input of a multiplexer 318, along with a right shifted version of the smallest value output by a right shifter 320 which is coupled to a second input of the multiplexer. The output of the multiplexer 318 is coupled to the B input of the subtractor 316. Finally, the output of the subtractor 316 is coupled to a left shifter 322 which generates the output of the near path. Accordingly, the right shifter 320 provides alignment for the near path if necessary, while the left shifter 322 provides normalization if necessary.

Various selection signals are provided to enable alignment and normalization, and therefore generate the appropriate output of the near path 306. In particular, the exponents $E_a$ and $E_b$ are provided to a subtractor circuit 324, the output of which is coupled to an absolute value circuit 326. When alignment is required, the alignment distance is provided by the absolute value of the difference between exponents. Accordingly, a comparator 327 compares the absolute value of the difference between the exponents to zero. The resulting zero align signal indicates whether the exponents are the same, and therefore is coupled to the selection input of multiplier 318 which enables performing alignment if necessary. However, because alignment in the near path only requires a one-bit shift, the 2-to-1 multiplier 318 enables the alignment by selecting between an unshifted mantissa value and the mantissa value right shifted by one bit. If the exponents are the same, the unshifted input to the multiplexer 318 is selected. Alternatively, the zero align signal may be obtained with sufficient exactness by generating an exclusive OR (XOR) of the least significant bits of the two exponents. To perform subtraction in the near path, it may be necessary to negatively weight the aligned quantity for a true subtraction of mantissas. This may be accomplished by correctly signing the shift quantity. The aligned and correctly signed mantissa is then added to the mantissa of the largest number.

The left shifter 322 performs a left shift by a near distance signal generated by a leading zero anticipation circuit 328. The near distance signal indicates the number of bits required for normalization after the subtraction by the subtractor 316. There are a number of ways of generating a near distance signal to make the appropriate left shift by left shift circuit 322. While a leading-zero-detection (LZD) circuit may be employed, they operate on the output of the subtractor 316 in the FPGA. Alternatively, a leading zero anticipation (LZA) circuit may operate directly on the mantissa and exponent inputs and anticipate the number of leading zeros in parallel with mantissa alignment and subtraction. An LZA circuit may be implemented efficiently using a lookup table (LUT) and carry-chain logic. The leading zero anticipation circuit 328 receives the mantissas and the exponents for each of the values, and determines the number of leading zeros, which is used to determine the amount of left shift required for normalization. When the exponents differ by 0 or 1 and the signs are opposite, there is the possibility that the leading digits will cancel. When this occurs, the result must be normalized by a left shift operation. Accordingly, the LZA circuit enables the mantissas and exponents to be examined directly, rather than examining the result of the subtraction. The output of the left shifter is provided with a lagging zero to generate an output of the near path 306 having (W+2) bits.

The far path 304 is also coupled to receive the outputs of the first multiplexer 308 and the second multiplexer 310 having an added leading "1" added. The larger value further receives a leading "0" and a lagging "000" and is coupled to the "A" input of an adder/subtractor circuit 330, while the smaller value is coupled to a right shift and sticky bit generator 332. When the exponents differ by greater than 1 or when the signs are the same as in the case of a far path addition or subtraction, normalization by more than 1 bit is no longer necessary. However, alignment is required, whereby the mantissa associated with the smallest number is right shifted to establish the correct relative significance. The right-shift operation also generates a 'sticky bit'. The sticky bit is required to be generated to implement the IEEE round-to-nearest-even (RTNE) behavior, and identifies the case when the result is exactly half-way between two values. For example, a binary number is half-way between two values when the bit pattern is "x . . . x.10 . . . 00". The round-to-nearest-even behavior may be encoded more succinctly by retaining the most significant bits of the remainder, which are referred to as the guard bit (G), round bit (R), and sticky bit (S). The latter indicates when one of the remaining bits is non-zero (i.e. it is the logical OR of the remaining bits). The guard bit ensures that the round bit is retained when a one bit left-shift is required for normalization in the far path. It should be noted that in the near path, the sticky bit is always zero. The output of adder/subtractor 330 is (W+4) bits in width, where 3 extra least significant bits represent G, R and S, and one additional msb is added by a leading "0" to allow for result growth when mantissas are added. Accordingly, a leading "0" and trailing "000" are provided to the largest value to generate a value having width of (W+4) bits, while a leading zero is provided to the output of the right shift and sticky bit generator 332 having a width of (W+3) bits to generate a word also having (W+4) bits.

Far path normalization requires a one-bit left shift or one-bit right shift, depending upon whether word growth or 1-leading-bit cancellation occurs. Accordingly, the output of the adder/subtractor 330 is coupled to a first input of a multiplexer 333, while a right shifted value shifted by a right shifter 334 is coupled to a second input and a left shifted value shifted by a left shifter 336 is coupled to a third input of the multiplexer 333. If a one-bit left shift is required, then the guard bit becomes the LSB and the round bit and sticky bit are retained to give a (W+2) bit result where 001x . . . xL.GRS→01x . . . xLG.RS0→1x . . . xxx.RS
and L is the LSB. If a one-bit right shift is required, then the updated round bit is obtained from the original guard bit, and the updated sticky bit, S', is the logical OR of the guard bit, round bit and sticky bit where 1x . . . xL.GRS→01x . . . x.LGRS→1x . . . x.R'S' where R'=L and S'=G OR R OR S. If no normalization shift is required, then

01x . . . xL.GRS→01x . . . xL.GRS→1x . . . L.R'S' where R'=G and S'=R OR S.

The two most significant bits of the output of the adder/subtractor circuit 330 are used to select the output value of the far path 304. In particular, if the two most significant bits are "00", a left shift is performed. If the two most significant bits are "01", there is no shift. Finally, a right shift is performed if the two most significant bits are "10" or "11". The two most significant bits are also coupled to an encoder 338 which provides a value used to update an exponent value. For example, if the most significant bits of the output of the adder/subtractor 33 are "00," the exponent will be increased by 1. If the most significant bits of the output of the adder/subtractor 330 are "01," the exponent will not change. Finally, if the most significant bits of the output of the adder/subtractor 330 are "1x," the exponent will be decreased by 1.

When determining whether to select the near or far path, it is necessary to make comparisons of certain components of the "a" and "b" values. Accordingly, a second comparator 340, which determines whether the absolute value difference between the exponents generated by the subtractor 324 is equal to zero or one, is coupled to a near/far signal generator 342. A multiplexer 344, which is coupled to receive the mantissa value outputs of the near path and the far path, will generate an output based upon a near/far signal generated by the near/far signal generator 342. A multiplexer 346, coupled to receive the output of the leading zero anticipation circuit 328 and the encode circuit 338, is also coupled to receive the output of the near/far signal generator 342 as a control signal.

In addition to receiving the output of the comparator 340, the near/far generator circuit 342 also receives the output of an exclusive NOR (XNOR) circuit 347 which is coupled to receive the sign $S_a$ of the "a" value and the output of an exclusive OR (XOR) circuit 348. The XOR circuit 348 is coupled to receive the sign $S_b$ of the "b" value and a subtract/add (−/+) value. An addition or subtraction is performed based upon the add/subtract signal generated by the XNOR circuit 347. That is, the XOR circuit 348 will invert the sign of "b" if a subtraction is to be performed. The XNOR circuit 347 generates an add/subtract signal by determining whether the sign of "a" and "b" are opposite, where the value would be added if the signs are the same. Accordingly, the near/far circuit generates a near/far signal based upon the output of the XNOR circuit 347 and the comparator 340 determining whether the exponents differ by 0 or 1, indicating a near path case, or that a true addition is performed, indicating a far path case. Finally, the larger exponent of $E_a$ and $E_b$ input to the multiplexer 354 are selected by a sign signal generated as an output of the subtractor 324. For example, if $E_a$ is larger than $E_b$, $E_a$ will be selected and coupled to an exponent update circuit 353 to generate the correct exponent.

The output of subtractor 316 may be negative. Because a positive result is required for signed-magnitude representation of the final sum, it is necessary to correct the sign. For example, it is possible to, predict the sign and swap inputs so that a negative sum is not generated. Alternatively, the sign can be applied to the output of subtractor 316 according to a further alternate embodiment.

Further, the sum generated by either the near or far path may have to be rounded. While RTNE is expensive to obtain in an FPGA, it is numerically important as it prevents a bias in rounding error, which may build up in large multiply accumulate operations. This bias is avoided by ensuring that, on average, the negative rounding error is the same as the positive rounding error. Using the MSB of the remainder is not sufficient on its own, as there are more situations where the result is rounded up than down. While a rounding error is symmetrical apart from the halfway point, where the most significant bit of the remainder is '1' and the remaining bits '0', RTNE requires that the excess bits to be examined to determine whether they lie exactly half way between valid results. If so, the sum will only be rounded up if it results in an even quantity (i.e the least-significant bit is 1 prior to rounding).

In order to ensure that the exponent $E_r$ of the result is correct, the output of a rounding circuit 352 will be coupled the exponent update circuit 353. That is, if the rounding circuit causes the value to be rounded up, leading to a carry to the most significant bit, the round overflow value will indicate that the exponent should be increased. Similarly, the exponent may be updated based upon the values of inputs to generate outputs of the near and far path. In a near path calculation, the exponent may be updated depending upon the output of the leading zero anticipation circuit 328. In a far calculation, the output of the encoder 338 is used to determine whether the exponent should be increased or decreased, as described above.

Finally, an output conditioning circuit 356 will receive various values to determine the result. Because the result of the floating-point arithmetic is normalized, it is possible to drop the hidden bit of the W bits output by the round circuit 352 to generate a W−1 value comprising the mantissa $M_r$ of the result. The output of the exponent update circuit 353, described above, is also coupled to the output conditioning circuit 356 to generate the exponent $E_r$ of the result. Also, floating-point arithmetic requires that certain special numbers be represented through special values of exponent and mantissa. These are detected at the input, and applied at the output using the output conditioning circuit 356. Accordingly, a special detect circuit 358 is coupled to the signs, exponents and mantissas of the "a" and "b" values, and the output of a multiplexer 360, which is controlled by the output of the smallest detect circuit 312. Multiplexer 360 selects the sign of the largest input. This will become the sign of the result $S_r$, unless modified by special detect circuit 358 to reflect a special output (such as not a number (NaN)). The special detect circuit 358 will generate the sign of the final result, and will generate an output type which will indicate if the value is a zero value, a non-value or a value of infinity. An invalid operation is also indicated by the special detect circuit 358 in the event of an invalid operation, such as 0 divided by 0 or infinity minus infinity.

A number of condition flags also provide an indication of whether an underflow, overflow or another invalid operation has occurred. Accordingly, a bound check circuit 362 indicates whether an overflow or an underflow condition exists based upon the output of the exponent update value. The output of the bound check will indicate a value of infinity in the event of an overflow and a value of zero in the event of an underflow. Finally, an update circuit 364 receives the cancellation signal output by the leading zero anticipation circuit 328, the output type, and the output of the bound check circuit 362. The cancellation signal determines whether A and B are equal, and the subtraction of B from A results in a value equal to zero. The output of the update circuit is used to control the output conditioning circuit 356 based upon the output type and the result of the bound check.

The circuits and methods of the present application provide significant improvements over conventional devices when implementing certain functions. The circuits of the present invention allow a single circuit to perform both floating-point addition or multiplication in a time-multiplexed way. The overhead of floating-point arithmetic is reduced, thereby allowing a circuit implemented in an FPGA to satisfy both fixed-point and floating-point requirements. That is, floating-point operations would effectively come without cost in terms of programmable logic fabric resources, thereby allowing existing applications requiring floating-point arithmetic to be better satisfied, without compromising those applications requiring fixed-point arithmetic. Enabling floating-point arithmetic within existing circuits of conventional FPGAs would allow the cost of floating-point arithmetic to be similar to fixed-point arithmetic. Therefore, a floating-point algorithm would no longer need to be converted to a fixed-point implementation, therefore avoiding the associated design time to analyse and simulate the fixed-point implementation. Such improvements would make an FPGA highly competitive from a power consumption perspective with other technologies implementing high-performance floating-point arithmetic.

Figure 4:
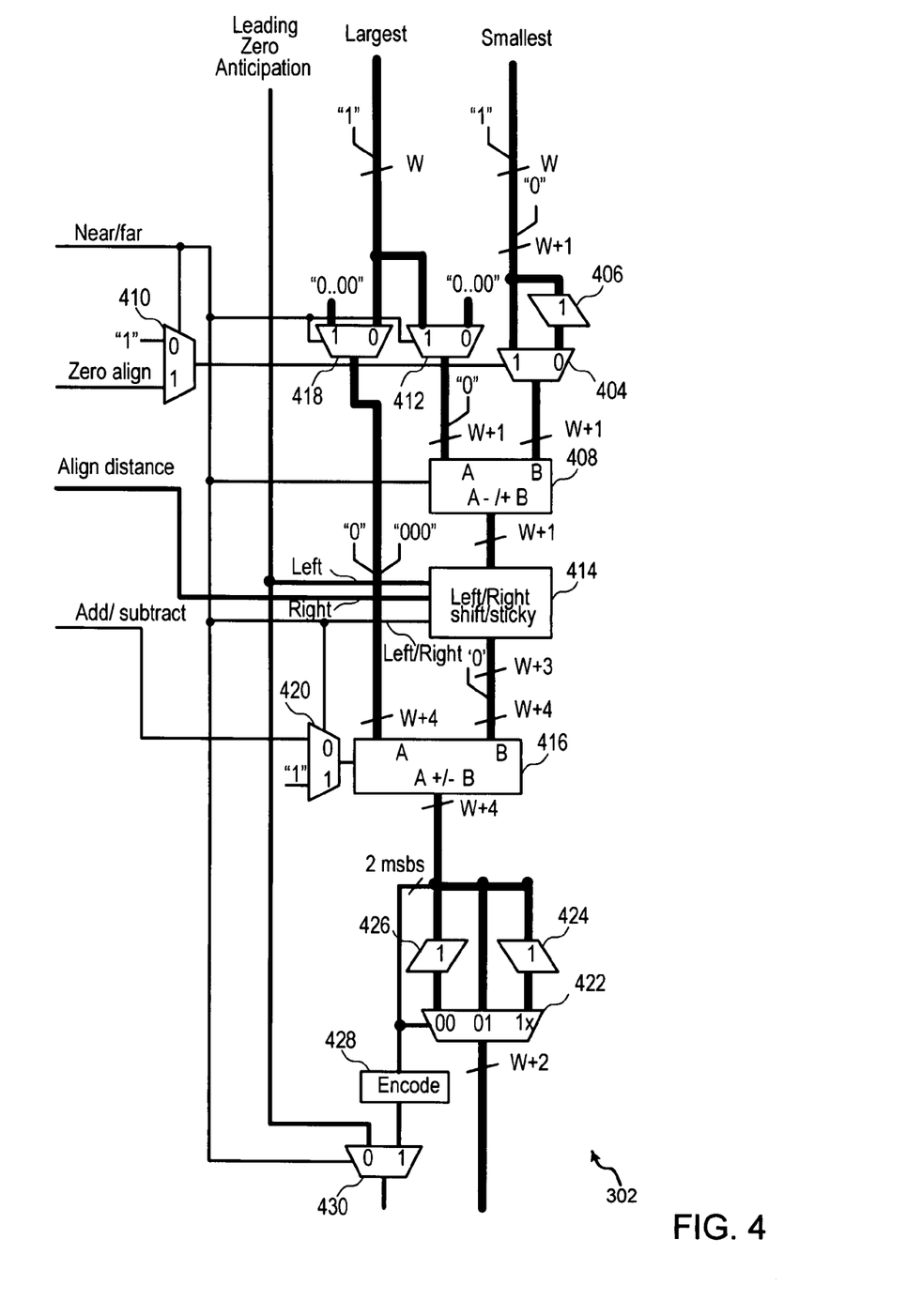
FIG. 4 is a block diagram of a circuit for implementing floating-point addition having a combined near path and far path according to an embodiment of the present invention.

Turning now to FIG. 4, a block diagram of a circuit for implementing floating-point addition having a combined near path and far path according to an embodiment of the present invention is shown. According to the circuit of FIG. 4, the dual path processing portion 302 comprises a combined near and far path having a multiplexer 404 coupled to receive the smallest value and a right-shifted value of the smallest value output by a right shifter 406. The output of the multiplexer 404 is coupled to the B input of an adder/subtractor 408, comprising a pre-adder. The value output by the multiplexer 404 is selected by the output of a multiplexer 410 which receives a logical "1" at the "0" input and the value of the zero align signal at the "1" input. The output of the multiplexer 410 is controlled by the near/far signal, where the first value (near) indicates the state when the signal is logically "1" and the second value (far) indicates the state when the signal is logically "0." When the far path is detected, the logical value of "1" is output by the multiplexer 410 to select the unshifted smallest value coupled to multiplexer 404. A multiplexer 412 is coupled to receive the largest value at the "1" input and a value of zero at the "0" input. The output of the multiplexer 412 is coupled to the A input of the adder/subtractor 408.

The near and far paths are merged to provide an architecture that requires only one shifter. In particular, the shifter 414 is capable of performing either left or right shift operations, and provides left shifting for a near-path calculation, and right shifting and sticky bit generation for a far-path calculation. Multiplexers 412 and 418 have been included to enable merged far and near paths. Multiplexer 412 enables the bypassing of the adder/subtractor circuit 408 preceding the shifter 414 in far-path calculations by setting input A to zero and the operation of adder/subtractor 408 to A+B. The multiplexer 418 also enable bypassing of adder/subtractor 416 for near-path calculations by setting the input A to zero and the operation of the adder/subtractor 416 to A+B. Further, using the multiplexer 410 to force zero align to '1' when performing far-path calculations ensures that the pre-adder input B of the adder/subtractor 408 is not 1-bit aligned. Alternatively, a 1-bit alignment right shift of the smallest value by right shifter 406 could remain provided that the subsequent alignment shift by shifter 414 is adjusted to perform only the remaining shift.

The adder/subtractor 416 is controlled by a multiplexer 420 which is coupled to receive the add/subtract value at the "0" input and a logical "1" at the "1" input. The near/far signal is used to select whether the add/subtract value or the logical "1" is used to control the adder/subtractor 416. Accordingly, in a near path calculation, an addition is always performed. The output of the adder/subtractor 416 is coupled to a first input of a multiplexer 422, while a right-shifted value shifted by a right shifter 424 is coupled to a second input and a left shifted value shifted by a left shifter 426 is coupled to a third input of the multiplexer 422. The encoder 428 provides a value which, if selected by the multiplexer 430 based upon the near/far value, will provide a value used to update an exponent value, as described above.

Figure 5:
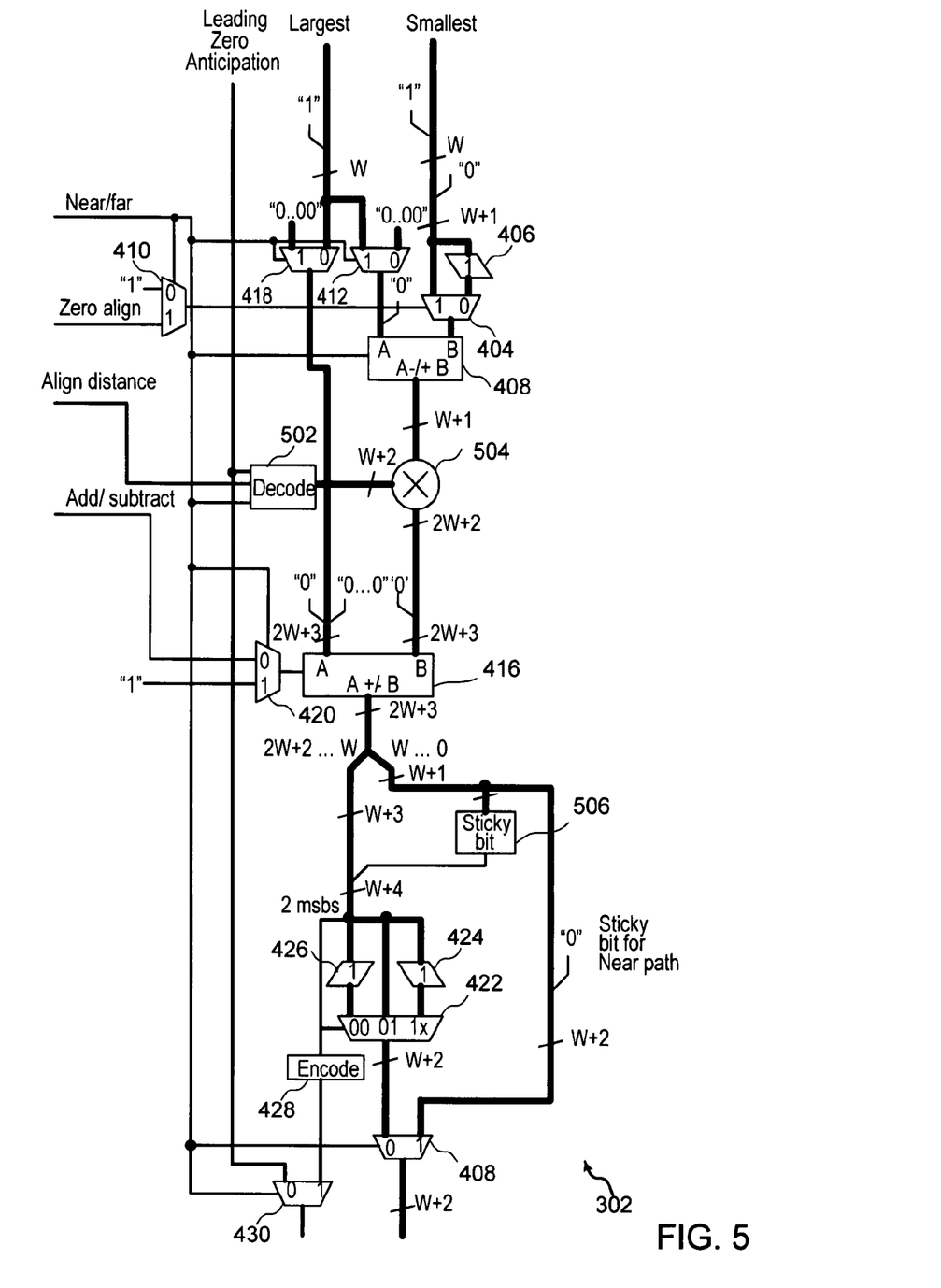
FIG. 5 is a block diagram of a circuit for implementing floating-point addition having a multiplier functioning as a shifter according to an embodiment of the present invention.

Turning now to FIG. 5, a block diagram of a circuit for implementing a floating-point adder having a multiplier functioning as a shifter according to an embodiment of the present invention is shown. Because a multiplier may be configured to perform a right or left shift, embodiments of the present invention may use the multiplier to perform both normalization and alignment shifts. The multiplier may be used to implement both left and right shifts by a distance determined by the number of bits in the multiplier input used to provide the shift quantity. Therefore, the shift distance of the multiplier is effectively doubled over conventional approaches by exploiting the extra output width that a multiplier inherently provides. Further, a floating-point addition may be performed using the same single multiplier employed in a floating-point multiplication. Any extra logic required to configure a multiplier as a shifter may be exploited by other applications requiring a shift operation. Accordingly, a single optimized circuit may be employed to provide both fixed and floating-point multiplication and addition. The use of a common resource to implement floating-point addition and multiplication also allows an optimum balance of operations to be achieved for a particular algorithm. The latency of a floating-point adder is often critical, as accumulation is a common requirement, and the time to produce and feedback the result determines the rate at which an accumulator will operate. The proposed approach reduces the latency of the floating-point addition and allows increased performance and ease of design.

Referring specifically to the circuit of FIG. 5, the circuit is similar to the circuit of FIG. 4, except that the shifter 414 is replaced by a decoder 502 and a multiplier 504. The right/left shift operation may be implemented using a multiplier with a circuit to convert the shift distance into a suitable scaling value. For example, this scaling quantity may contain a single bit set to provide the necessary level of scaling based upon the position of the bit. The scaling word is produced differently for a right shift or a left shift, and the appropriate half of the multiplier output is selected accordingly. For a 0 to (W−1) bit shift of a W-bit quantity, x, a shift quantity for a left shift is given by $s=2^l$, where l represents the distance of the left shift. The multiplication is performed according to the equation p=x*s, and the W least significant bits of p are selected. A shift quantity for a right shift is given by $s=2^{(W-r)}$, where r represents the distance of the right shift. The result is scaled by $2^W$, and so it must be right-shifted by W bits. However, before this is done, the entire 2W-bit shifted result is available, which may be useful for sticky bit generation by sticky bit generator 506. Therefore, as right/left shift capability may be obtained by appropriately generating the value "s", and using a multiplexer on the output to select either the upper or the lower bits depending upon whether a right or left shift is required. The selection is performed by multiplexer 408.

Figure 6:
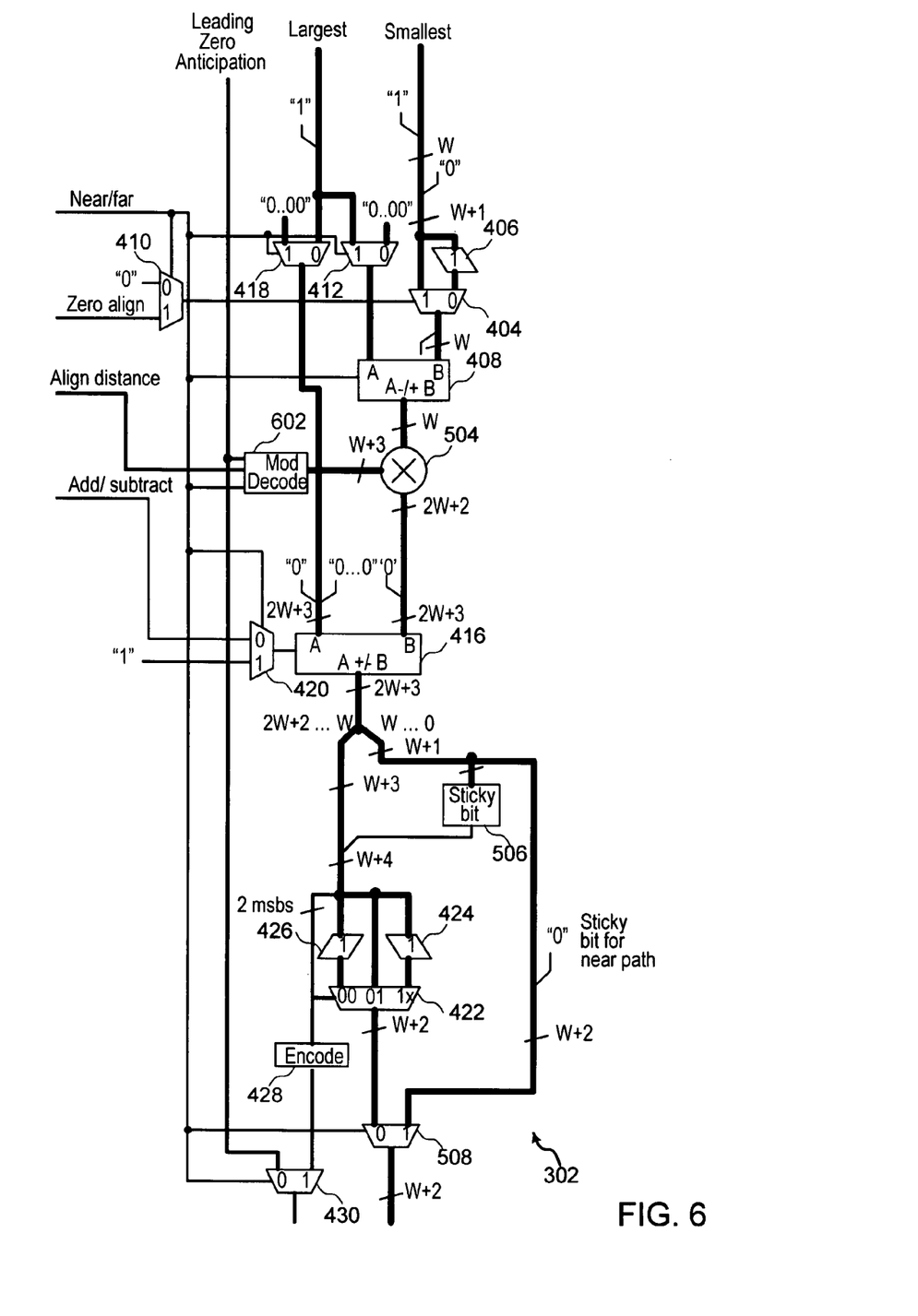
FIG. 6 is a block diagram of a circuit for implementing floating-point addition enabling single precision addition using a single floating-point adder circuit according to an embodiment of the present invention.

Turning now to FIG. 6, a block diagram of a circuit for implementing a floating-point adder enabling single precision addition using a single floating-point adder circuit according to an embodiment of the present invention is shown. While the circuit of FIG. 5 requires a (W+2)-bit by (W+1)-bit unsigned multiplier, FIG. 6 comprises a modified decoder and an additional multiplexer to force a 1-bit shift on the B input of the pre-adder during far-path calculations. In particular, a logical "0" is selected by multiplexer 410 during far path calculations. For single precision addition where W=24, a (26 by 25)-bit unsigned multiplier would be required. Accordingly, two circuits performing arithmetic functions of a conventional circuit may be required to create a (34 by 24)-bit unsigned multiplier. However, it is possible to modify the multiplier size requirement to (W+3) by W according to the embodiment of FIG. 6 so that a single arithmetic circuit may be employed. This is accomplished by noting that the far path calculation only requires a W-bit value to be right shifted, while the near path requires a (W+1)-bit value to be left shifted. However, the result after a normalizing left-shift always has the leading bit set, unless there is complete cancellation, which is addressed separately. Therefore, the leading bit of the output of the adder/subtractor 408 is redundant and may be dropped. This allows both the adder/subtractor 408 and multiplier 504 to adopt W-bit values. When performing the far path calculation, a leading "1" may not be dropped. However, it is possible to retain this bit by shifting the W-bit 'Smallest' mantissa 1-bit to the right, and compensating in the right-shift implemented by the multiplier 504. Because there is already a 1-bit right-shift available on the 'Smallest' path, it is only necessary to enable it during far-path calculations and adjust the shift distance of the modified decoder 602 to compensate by 1.

Figure 7:
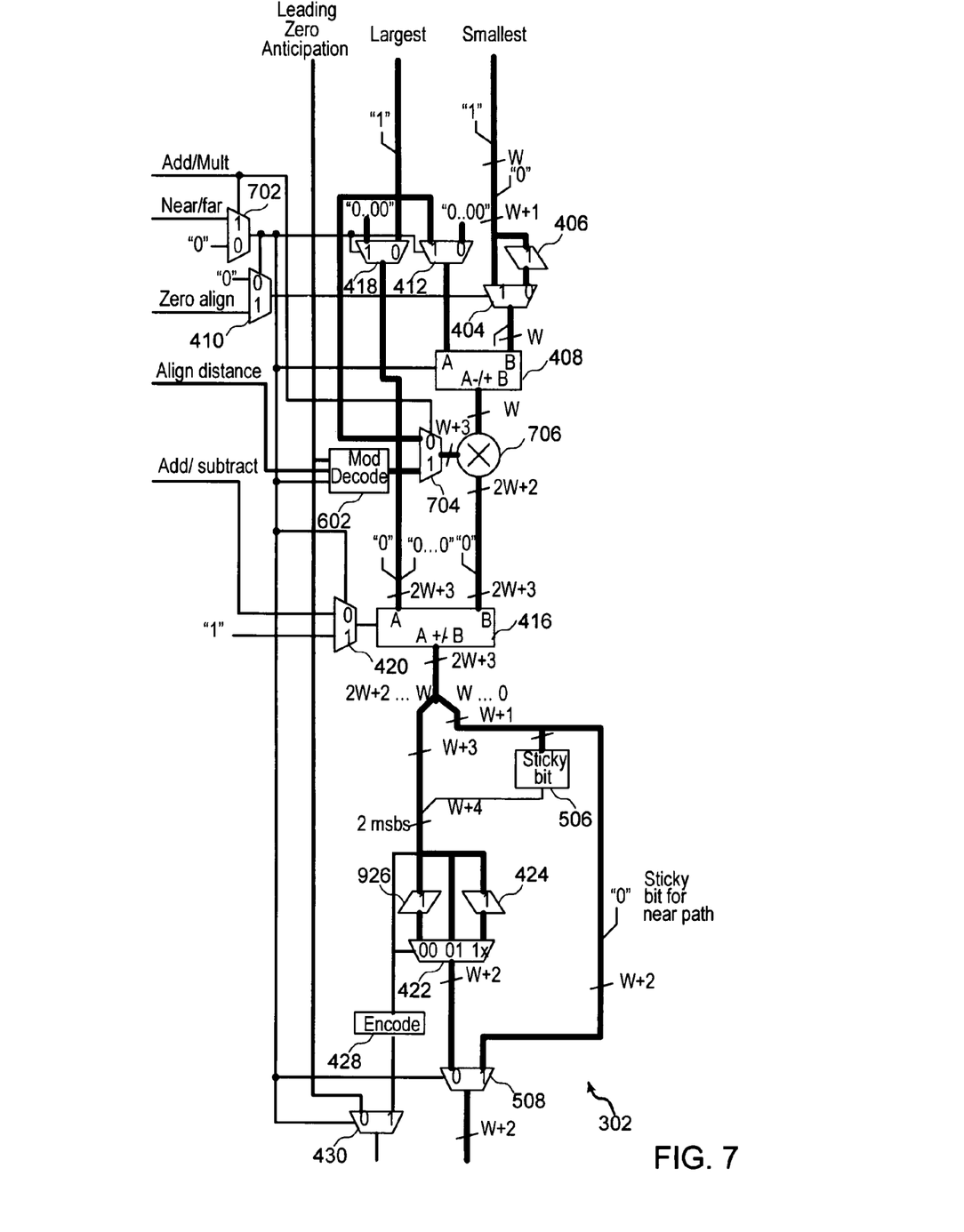
FIG. 7 is a block diagram of a circuit for implementing a floating-point adder or multiplier using the same multiplier according to an embodiment of the present invention.

Turning now to FIG. 7, a block diagram of a circuit for implementing a floating-point adder or multiplier using the same multiplier according to an embodiment of the present invention is shown. Module 302 input signal Add/Mult selects between floating-point addition and multiplication. When performing addition, multiplexers 702 and 704 provide the circuit described previously. When performing multiplication, multiplexer 702 forces the datapath into the far path behavior, and so the Smallest input is routed to one input of multiplier 706, bypassing subtractor/adder 408. Multiplexer 704 re-routes the largest input directly to the other input of multiplier 706. The output of multiplier 706 is rounded and normalized by the same circuits provided for addition.

Figure 8:
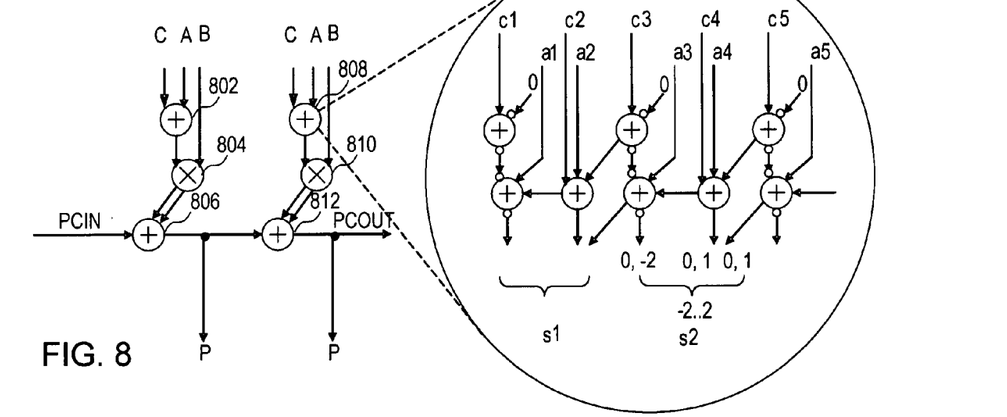
FIG. 8 is a block diagram of the dual path processing portion 302 according to an embodiment of the present invention.

Turning now to FIG. 8, a block diagram of the dual path processing portion 302 according to an embodiment of the present invention is shown. That is, the circuit of FIG. 8 shows the arrangement of a multiplier and adders corresponding to the arrangements in FIGS. 5-7, where adder 802 corresponds to adder/subtractor 408, multiplier 804 corresponds to multiplier 504, and adder 806 corresponds to adder/subtractor 416, for example. According to the circuit of FIG. 8, a pre-adder circuit 802 is coupled to receive the A and C inputs, and generate an output which is coupled to a multiplier 804. The multiplier 804 is also coupled to receive the B input, and generate an output to an adder 806 which also receive a product carry in (PCIN). A second pre-adder circuit 808 is coupled to receive the A and C inputs, and generate an output which is coupled to a multiplier 810. The multiplier 810 is also coupled to receive the B input, and generate an output to an adder 812 which also receives the output of the adder 806 and generates a product carry out (PCOUT).

The adders, such as adder 808 of FIG. 8, comprise 3-input full adders generating a two-bit output comprising a sum and a carry, as shown in more detail in the expanded section of FIG. 8. An input with arithmetic values +1/0 take logical encodings 1/0, and negatively weighted signals with arithmetic values −1/0 take logical encodings 0/1. By using inverters on the inputs of the adders, it is possible to add negatively weighted signals using a standard full-adder circuit. The sign of the sum and carry outputs are chosen to reflect the range of the total, as shown in Table 1.

TABLE 1

| Number of negatively weight inputs | Carry | Sum |
|---|---|---|
| 0 | + | + |
| 1 | + | − |
| 2 | − | + |
| 3 | − | − |

For one negatively weight input, the range of the total output is −1 to 2, so weighting the sum negatively and the carry positively gives us this range i.e. −1≦2*C+S≦2. The truth-table for adder with one negatively weight input is shown in Table 2.

TABLE 2

| Logical value of input | | | Arithmetic value of input | | | Logical value of output | | Weighted arithmetic value of output | | Total arithmetic value of output |
|---|---|---|---|---|---|---|---|---|---|---|
| $I_2$ | $I_1$ | $I_0$ | $I_2$ | $I_1$ | $I_0$ | carry | sum | carry | sum | total |
| 0 | 0 | 0 | 0 | 0 | −1 | 0 | 0 | 0 | −1 | −1 |
| 0 | 0 | 1 | 0 | 0 | 0 | 0 | 1 | 0 | 0 | 0 |
| 0 | 1 | 0 | 0 | 1 | −1 | 0 | 1 | 0 | 0 | 0 |
| 0 | 1 | 1 | 0 | 1 | 0 | 1 | 0 | 2 | −1 | 1 |
| 1 | 0 | 0 | 1 | 0 | −1 | 0 | 1 | 0 | 0 | 0 |
| 1 | 0 | 1 | 1 | 0 | 0 | 1 | 0 | 2 | −1 | 1 |
| 1 | 1 | 0 | 1 | 1 | −1 | 1 | 0 | 2 | −1 | 1 |
| 1 | 1 | 1 | 1 | 1 | 0 | 1 | 1 | 2 | 0 | 2 |

Further, the combination of a pre-adder with multiplier Booth recoding avoids the cost and delay of dedicated carry-propagate adder. That is, the pre-adder may be done redundantly in combination with Booth recoding, and the cost and delay of a fast carry-propagate adder is avoided. FIG. 8 shows how recoding may be done at the same time as the addition. The recoded output has half of the number of digits as the input (i.e. it is radix-4 rather than radix-2), and uses 3 binary signals weighted by −2, 1 and 1 to represent the recoded digit values −2 to +2. The benefit of this recoding is that it allows the multiplication by the radix-4 digit to be achieved by a shift-complement operation. This adder circuit of FIG. 8 showing combining recoding with the pre-adder using a full-adder is provided by way of example, and the precise logic employed would depend upon how the multiplier partial products are formed. For example, the multiplier might use a radix-8 scheme, or the digit representation might be different than −2, 1, 1 (e.g. 2, −1, −1).

Figure 9:
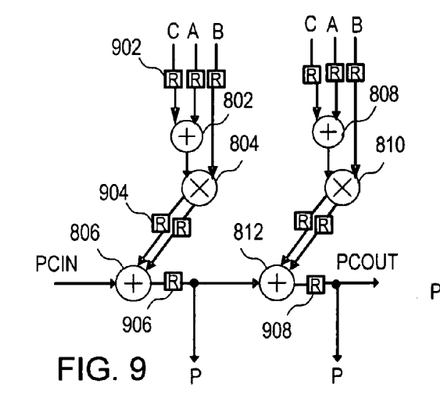
FIG. 9 is a block diagram of the dual path processing portion 302 having a fully pipelined multiplier according to an embodiment of the present invention.
Figure 10:
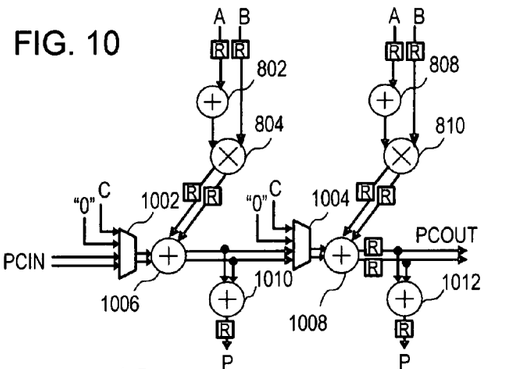
FIG. 10 is a block diagram of the dual path processing portion 302 having a fully pipelined multiplier with a redundant product cascade according to an embodiment of the present invention.
Figure 11:
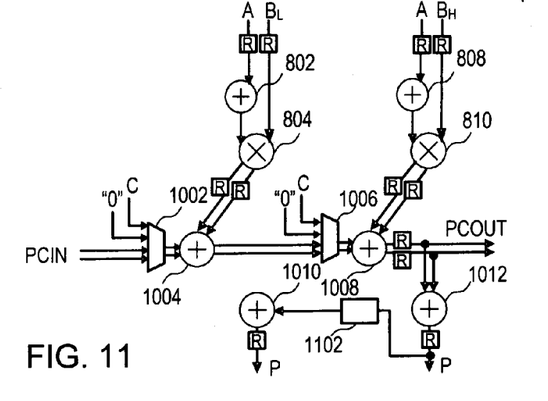
FIG. 11 is a block diagram of the dual path processing portion 302 having a rounding circuit for the redundant product cascade of FIG. 10 according to an embodiment of the present invention.

A block diagram of the dual path processing portion 302 having a fully pipelined multiplier is shown in FIG. 9, where a register is included in the input path to each multiplier and adder. However, when implementing a 25-bit multiply-add in an FPGA as shown in FIG. 9, the FPGA incurs a 4-cycle latency. This latency comes from the input register 902, multiplier output register 904, first adder output register 906 and a second adder output register 908. According to the circuit of FIG. 10, the dual path processing portion 302 comprises a fully pipelined multiplier with a redundant product cascade. In particular, the latency of a cascaded multiply-add circuit in conventional devices may be reduced by maintaining a redundant representation for the product cascade, as shown FIG. 10. The 3-1 adder becomes a 4-2 adder where multiplexers 1002 and 1004 select between the C input and a redundant input set to a logical "0" and the PCIN inputs. The adders 1006 and 1008 are coupled to the output of the multiplexers 1002 and 1004, respectively, while the carry propogate adders 1010 and 1012 are coupled to the outputs of the adders 1006 and 1008, respectively. By avoiding a carry-propagate addition within each stage of the cascade by the use of adder 1006 and 1008, it is possible to reduce the overall delay of a cascade, such that it might be registered every 2 or possibly 4 stages with an associated reduction in latency. For the 25-bit adder, this could reduce latency from 4 to 3 cycles. The use of a redundant representation for the intermediate products allows larger multipliers to be built from smaller ones without a significant timing penalty. Finally, a rounding circuit for the redundant product cascade of FIG. 10 is shown in FIG. 11. If a redundant cascade is used, then there will be one carry propagate adder every 2 multiply-add circuits which may potentially be used for rounding. As shown in FIG. 11, the carry propagate adder 1010 is used for rounding the output of pre-rounder normalization logic 1102.

Figure 12:
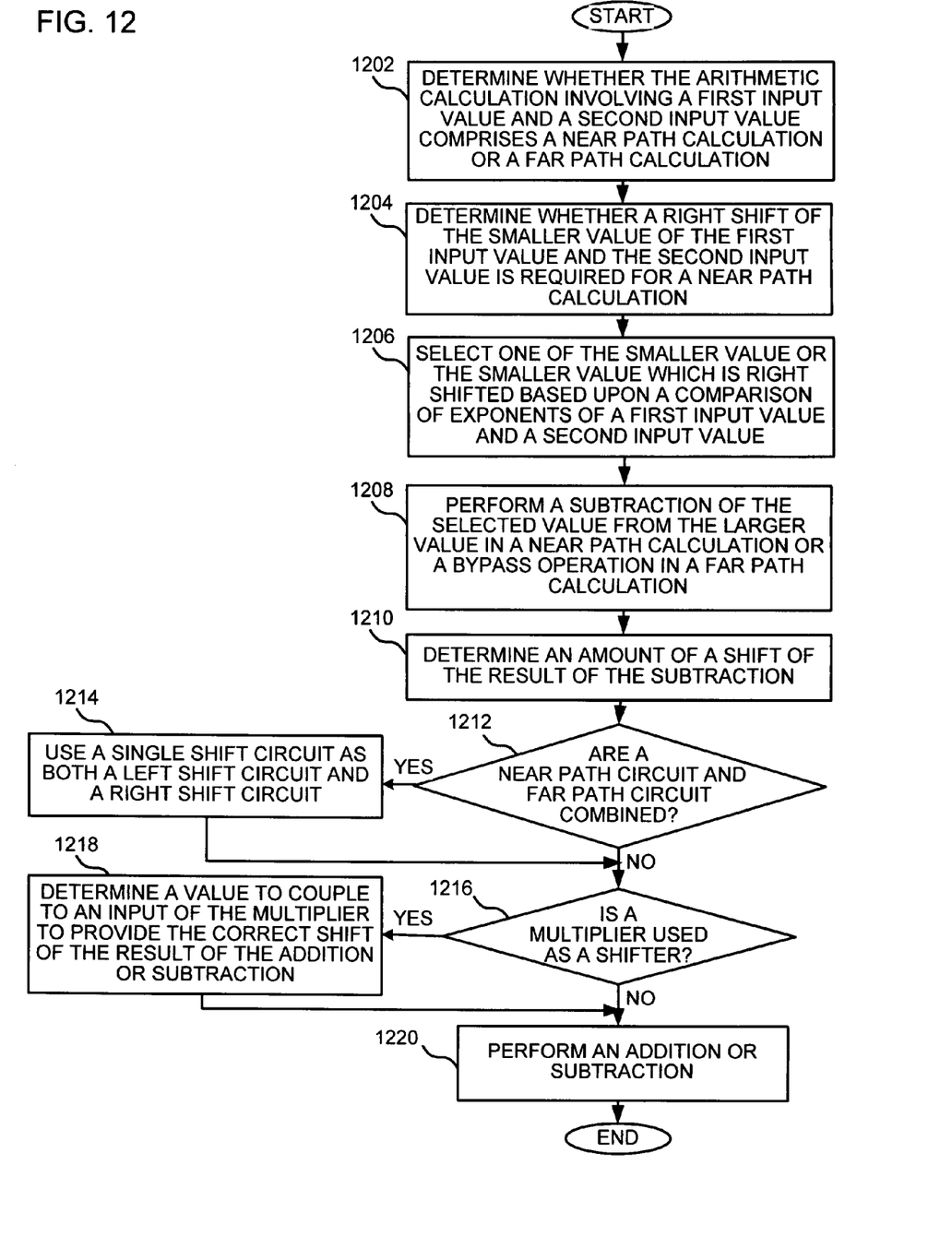
FIG. 12 is a flow chart showing a method of providing a floating-point adder according to an embodiment of the present invention.

Turning now to FIG. 12, a flow chart shows a method of providing a floating-point adder according to an embodiment of the present invention. In particular, it is determined whether the arithmetic calculation involving a first input value and a second input value comprises a near path calculation or a far path calculation at a step 1202. It is also determined whether a right shift of the smaller value of the first input value and the second input value is required for a near path calculation at a step 1204. One of the smaller value or the smaller value which is right shifted is selected based upon a comparison of exponents of a first input value and a second input value at a step 1206. A subtraction of the selected value from the larger value is performed in a near path calculation or a bypass operation is performed in a far path calculation at a step 1208. An amount of a shift of the result of the subtraction is determined at a step 1210. It is then determined whether a near path circuit and far path circuit are combined at a step 1212. If so, a single shift circuit is used as both a left shift circuit and a right shift circuit at a step 1214. It is also determined whether a multiplier is used as a shifter at a step 1216. If so, a value to be coupled to an input of the multiplier is determined to provide the correct shift of the result of the addition or subtraction at a step 1218. An addition or subtraction is performed at a step 1220 to perform in a far path calculation the addition or subtraction of the larger value and the output of the multiplier which is the aligned smaller value. The method of FIG. 12 as described above may be employed using any of the circuits of 1-11 as described above, or other suitable circuits.

The circuits and methods set forth above enable a floating-point adder that uses a fixed-point multiplier to implement much of the underlying operation, thereby allowing floating-point multiplication and addition to be based upon a common optimized component that is also critical to the more common fixed-point requirement. According to one aspect of the present invention, both floating-point addition and multiplication may be efficiently performed using a common embedded fixed-point building block of conventional circuits. Re-using fixed-point building blocks allows either fixed-point or floating-point to be implemented.

It can therefore be appreciated that a new and novel circuit for and method of providing a floating-point adder has been described. It will be appreciated by those skilled in the art that numerous alternatives and equivalents will be seen to exist which incorporate the disclosed invention. As a result, the invention is not to be limited by the foregoing embodiments, but only by the following claims.

What is claimed is:

1. A floating-point adder circuit, comprising:
an input multiplexer coupled to receive a first input value and a second input value;
a first adder-subtractor circuit implemented as a subtraction circuit for a near path calculation of the floating-point adder circuit, the first adder-subtractor circuit selectively coupled to receive one of the first input value and the second input value at each of a first input and a second input, wherein the value coupled to the second input is added to or subtracted from the value coupled to the first input;
a right shift circuit for aligning the smaller of the first input value and the second input value which is coupled to the second input of the first adder-subtractor circuit;
an additional shift circuit coupled to an output of the first adder-subtractor circuit, the additional shift circuit providing left shifting for a near path calculation and right shifting for a far path calculation; and
a second adder-subtractor circuit coupled to an output of the additional shift circuit, wherein the additional shift circuit and the second adder-subtractor circuit are used in both near path calculations and far path calculations.

2. The floating point adder circuit of claim 1, wherein the first adder-subtractor circuit comprises an adder-subtractor circuit of a combined near path and far path.

3. The floating point adder circuit of claim 2, wherein the additional shift circuit comprises a left shift/right shift circuit of the combined near path and far path, and provides normalization in a near path calculation when the left shift/right shift circuit is providing a left shift and provides alignment in a far path calculation when performing a left shift.

4. The floating point adder circuit of claim 3, further comprising a leading zero anticipation circuit coupled to receive at least a portion of the first and second input values, the leading zero anticipation circuit providing a shift value when the left shift/right shift circuit is performing a right shift.

5. The floating point adder circuit of claim 1, wherein:
the first adder-subtractor circuit comprises a subtractor circuit.

6. A floating-point adder circuit, comprising:
an input multiplexer coupled to receive a first input value and a second input value, the first and second input values comprising mantissas of first and second values provided to the floating-point adder circuit in a floating-point format;
a first adder-subtractor circuit selectively coupled to receive one of the first input value and the second input value at each of a first input and a second input, wherein the value coupled to the second input is added to or subtracted from the value coupled to the first input;
a multiplier coupled to receive an output of the first adder-subtractor circuit, the multiplier providing left shifting for a near path calculation and right shifting for a far path calculation; and
a second adder-subtractor circuit coupled to receive an output of the multiplier, wherein the second adder-subtractor circuit is used in both near path calculations and far path calculations.

7. The floating point adder circuit of claim 6, wherein the first adder-subtractor circuit comprises a subtraction circuit for a near path calculation of a combined near path and far path of the circuit.

8. The floating point adder circuit of claim 6, further comprising a right shift circuit for aligning a smaller of the first input value and the second input value which is coupled to the second input of the first adder-subtractor circuit.

9. The floating point adder circuit of claim 6, further comprising a leading zero anticipation circuit coupled to receive at least a portion of the first input value and the second input value, the leading zero anticipation circuit providing a shift value when performing a left shift after a subtraction by the first adder-subtraction circuit.

10. The floating point adder circuit of claim 9, further comprising a decoder coupled to receive an output of the leading zero anticipation circuit, the decoder generating a value for enabling the multiplier to shift the output of the first adder-subtractor circuit by a predetermined value based upon a value generated by the decoder.

11. The floating point adder circuit of claim 10, wherein the multiplier provides normalization for a near path calculation.

12. The floating point adder circuit of claim 6, further comprising a normalization circuit coupled to an output of the second adder-subtractor circuit, the normalization circuit providing normalization for a far path calculation.

13. A method of enabling an arithmetic calculation using values in a floating-point format, the method comprising:
- determining, using a subtractor circuit, whether the arithmetic calculation involving a first input value and a second input value comprises a near path calculation or a far path calculation;
- determining whether a right shift of a smaller value of the first input value and the second input value is required for a near path calculation;
- selecting one of the smaller value or the smaller value which is right shifted based upon a comparison of exponents of the first input value and the second input value;
- generating a result based upon an addition of the selected value to the larger value of the first input value and the second input value or a subtraction of the selected value from the larger value of the first input value and the second input value;
- determining whether to perform a right shift or a left shift of the result based upon whether the arithmetic calculation comprises a near path calculation or a far path calculation;
- determining an amount of the right shift or left shift of the result; and
- outputting, by a floating-point adder circuit, a shifted result of the addition or subtraction.

14. The method of claim 13, wherein determining the amount of the shift of the result comprises using a single shift circuit as both a left shift circuit and a right shift circuit.

15. The method of claim 13, further comprising using a redundant product cascade within a plurality of multiplier stages, wherein outputting the shifted result of the addition or subtraction comprises using at least one of the plurality of multiplier stages.

16. The method of claim 15, further comprising using a pre-adder to enable Booth recoding in the plurality of multiplier stages.

17. The method of claim 13, further comprising:
- shifting the result based upon the addition or subtraction using a multiplier as a shifter to provide both left shifting and right shifting; and
- determining a value to couple to an input of the multiplier to provide a correct shift of the result based upon the addition or subtraction,
- wherein an output of the multiplier is used in a second addition or subtraction.

18. The method of claim 17, further comprising performing the second addition or subtraction using the output of the multiplier for generating a far path output.

* * * * *